United States Patent

Heyden et al.

[15] 3,700,861

[45] Oct. 24, 1972

[54] DATA CARD TERMINAL

[72] Inventors: Vander Heyden; Eric Ernest, both of Hummelstown, Pa.

[73] Assignee: AMP Incorporated, Harrisburg, Pa.

[22] Filed: Oct. 19, 1970

[21] Appl. No.: 81,985

[52] U.S. Cl.......................235/61.11 B, 235/61.11 R

[51] Int. Cl................................................G06k 7/04

[58] Field of Search.......235/61.11 B, 92; 340/172.5, 340/173, 174 M

[56] References Cited

UNITED STATES PATENTS

| | | | |
|---|---|---|---|
| 2,895,124 | 7/1959 | Harris | 235/92 |
| 3,469,242 | 9/1969 | Eachus | 340/174 M |
| 3,434,128 | 3/1969 | Shively | 340/174 M |
| 3,378,822 | 4/1968 | Kaufman et al. | 340/173 |

*Primary Examiner*—Maynard R. Wilbur
*Assistant Examiner*—William W. Cochran
*Attorney*—William J. Keating, Ronald D. Grefe, Gerald K. Kita, Frederick W. Raring and Jay L. Seitchik

[57] ABSTRACT

The disclosure relates to a high speed electronic scanner terminal for scanning information on a column by column basis which is located in switch operated and card operated devices. The system includes a start cycle device which permits an operating cycle to start only if all information containing devices are closed and all card receiving units have data cards inserted in them. The system includes a pair of clocks and converts information readout in one out of ten code one column by column basis into serial code compatible with a remote receiving unit.

8 Claims, 4 Drawing Figures

DATA CARD TERMINAL

The invention relates to a high speed electronic scanner terminal and, more specifically, to a scanner terminal capable of sampling data on a column by column basis and transmitting the data serially to a remote station where said data is operated upon.

With the increased use of data storage and computer systems as well as the rapid advance in the state of these arts, it is becoming increasingly apparent that many business operations heretofore impossible to perform economically now become a part of art. Included in this area is the increased use of data bearing cards of various types, either alone or in conjunction with switch operated units for transmitting variable as well as constant data. For example, it is possible in accordance with the subject disclosure, to provide credit card use at a store wherein the date and amount of sale are variable whereas the terminal address is hard wired and customer and store information are entered in the form of data bearing cards.

Systems capable of providing the above described functions have been relatively complex and have therefore not found widespread use despite the known desirability of such devices. In accordance with the present invention, the above noted problems of the prior art are overcome and a relatively simple and inexpensive device is provided which is capable of performing the above described functions.

Briefly, in accordance with the present invention, there is provided a data card terminal which includes a plurality of devices, some capable of receiving data bearing cards and others manually settable, each of the devices being scannable by an electronic scanner on a column by column basis to read out the data set into said devices. The terminal will not operate unless all of the devices are in operating condition with data properly placed therein. When the terminal is started, after a time delay, if there is no error, the start cycle is activated and the electronic scanner steps along, a column at a time to read out the data.

It is therefore an object of this invention to provide a data card terminal which is not complex and can be operated without significant training.

It is a further object of this invention to provide a data card terminal which is easy to operate, yet relatively low in cost.

It is a still further object of this invention to provide a data card terminal.

Figure 1:
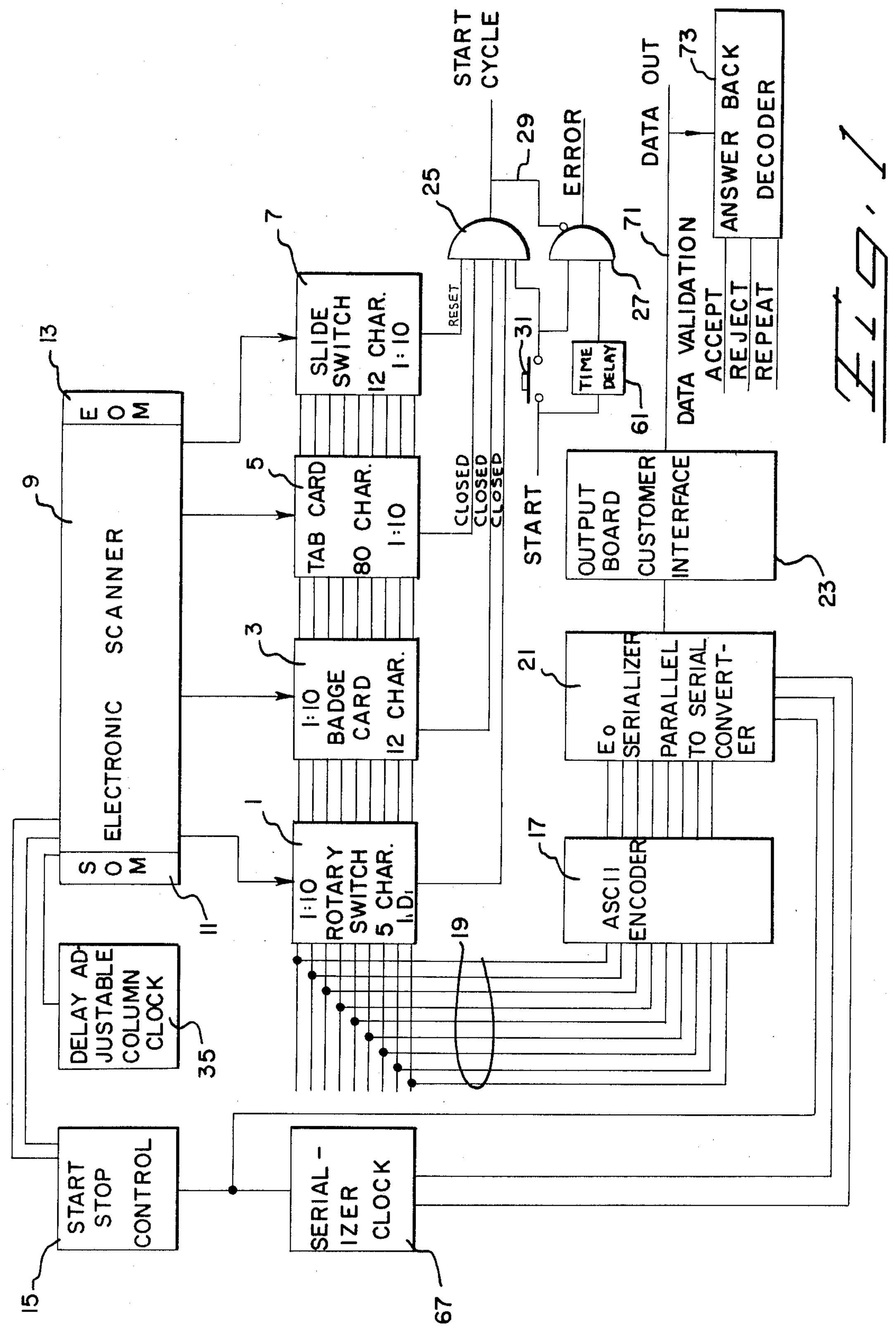
Figure 2A:
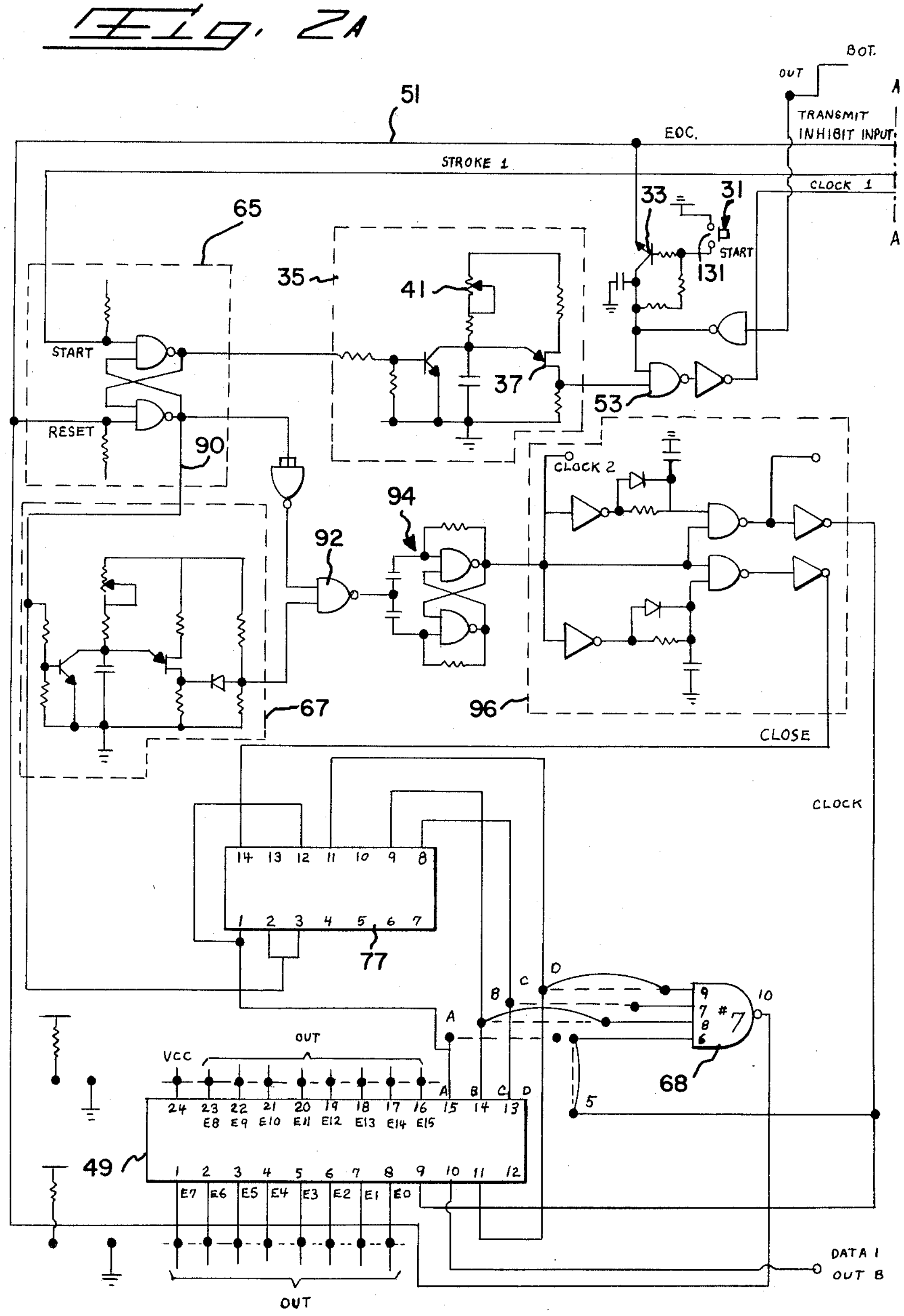
Figure 2B:
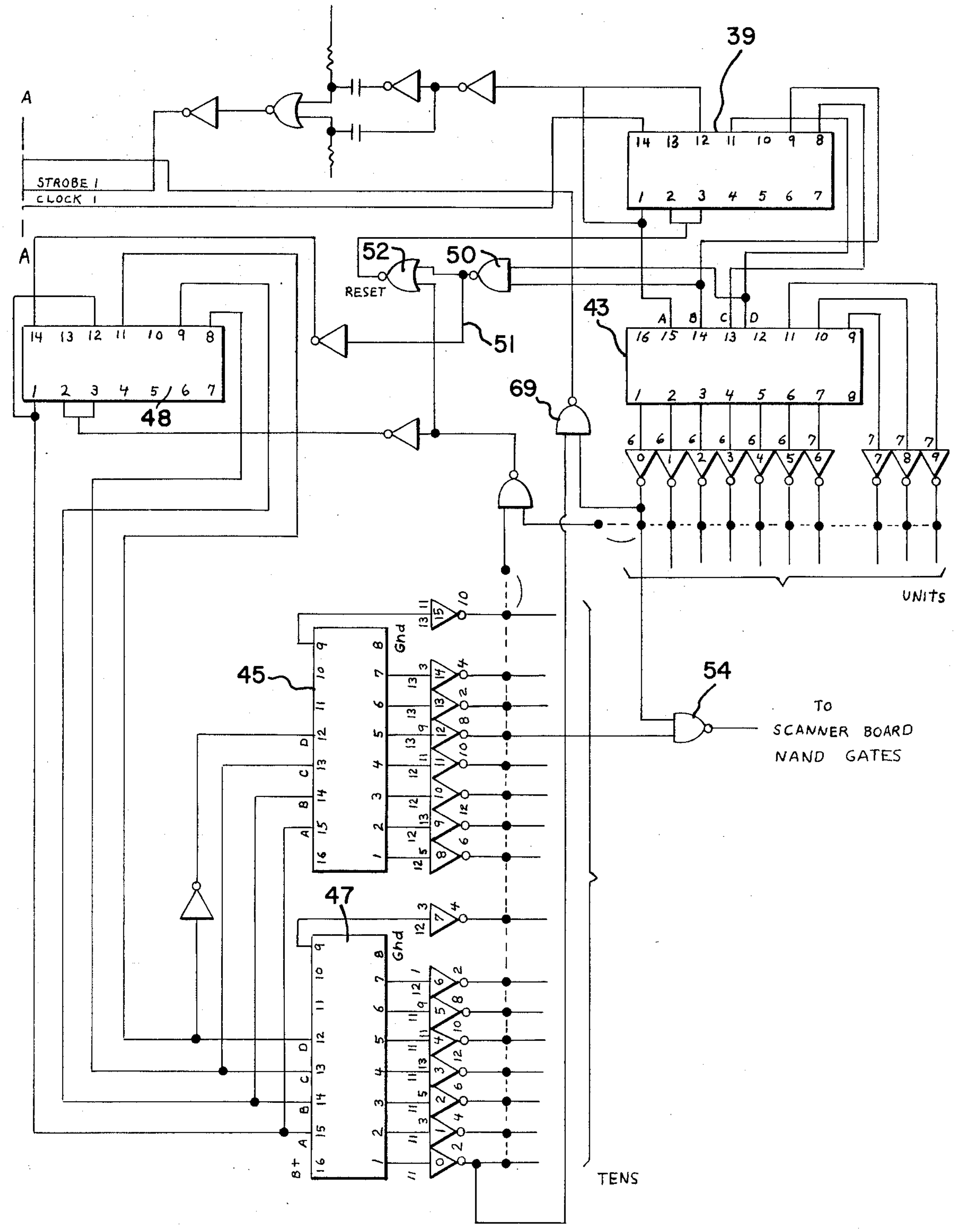
Figure 7:
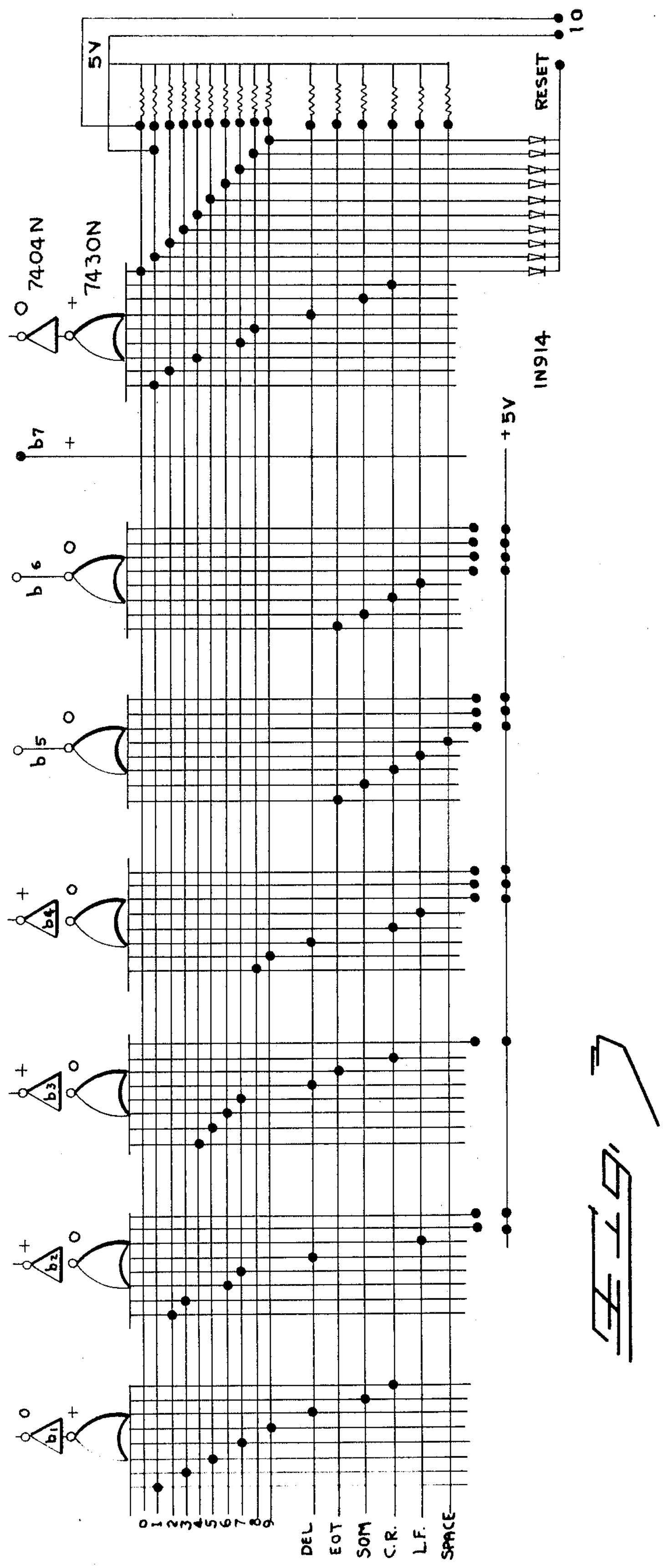

The above objects and still further objects of the invention will immediately become apparent to those skilled in the art after consideration of the following specific preferred embodiment thereof, which is provided by way of example and not by way of limitation, wherein:

FIG. 1 is a block diagram of a data card terminal in accordance with the present invention;

FIGS. 2A and 2B together constitute a circuit diagram of a portion of the data card terminal of FIG. 1; and FIG. 3 is a circuit diagram of the encoder 17 of FIG. 1.

Referring now to FIG. 1, there is shown a block diagram of a preferred embodiment of a terminal in accordance with the present invention. The terminal includes a rotary switch device 1 which is settable to particular numbers (i.e. a five digit number set by five rotary switches), and badge card reader 3 which can accept a data card, a tab card receiving device 5 which can accept IBM cards and the like and a slide switch mechanism 7 wherein the switch elements can provide a settable output signal when scanned (i.e. a 12 digit number set by 12 slide switches). The columns of the elements 1, 3, 5 and 7 are scanned under the control of an electronic scanner 9 after all switches have been set, the scanner including a start of message output position 11 and end of message output position 13 from which signals are provided during the scan. The system is started by operation of the start push button 31 which forms part of the start stop control 15.

The start operation is initiated by depressing the start button 31 and feeding the signal to an AND gate 25 in conjunction with the signals from each of the members of the data input devices. It is required that all of the data input devices be in operating condition or closed in order that the start cycle begin. An error AND gate 27 is also primed by operation of the start button 31. This AND gate is inhibited when the start cycle is properly working via lead 29, otherwise the error gate is not inhibited. The error gate is not open except after a short time delay provided by timer delay 61 in order that all of the information matrix members will have a chance to be in operation and not provide a false error signal.

The electronic scanner now begins to scan the information columns of units 1, 3, 5 and 7 under control of the start stop control 15 and the column clock 35 by providing a start of message (SOM) signal 11, the scanned information from units 1, 3, 5 and 7 and the end of message (EOM) signal 13.

In this way the columns are scanned serially by means of the electronic scanner 9. Where a hole is found on a particular column in a card that is being scanned or other indication, as the case requires, an output is provided along one of the ten row lines 19 due to the hole in the card completing the circuit. These lines provide a signal to the ASCII encoder 17 which receives a 1 out of 10 code from the row lines 19 and converts it to a seven bit code plus an eighth parity bit, this conversion being hard wired in the ASCII coder (Fig. 3). The output of the ASCII encoder 17 is sent to a serializer 21 which is under control of serializer clock 67 and which receives the eight bit code in parallel and converts it to a serial output with parity, the serial output being sent to an output board or interface 23 wherein it is converted to the desired output code and sent out on the data output line 71.

The terminal can also receive information back on the data line 71 which is fed back to an answer back decoder 73 and provides an indication as to whether the data is accepted, rejected or should be retransmitted.

Referring now to FIGS. 2A and 2B, for a more detailed description, operation of the start push button 31 closes switch 131 and turns off transistor 33 and allows a clock pulse to go through unijunction 37 of column clock 35 and follow the clock 1 line to the units binary counter 39 via AND gate 53. The counter 39 is run by the column clock 35 which generates a uniform pulse and also provides the ability to adjust the inter character interval via variable resistor 41. The binary counter 39 has the binary count therein on leads A, B, C and D converted to a 1 out of 10 code in decoder 43 and therefore counts the units by taking the binary count and converting it to a decimal count. Decoder 43 is therefore a binary to decimal converter. It counts from zero to nine and on the tenth count, together with decoders 45 and 47 sets the column count or position of the scanner. Decoder 43 counts the units and clocks the decimal counter 48 via leads 51 and NAND gate 50. Also unit counter 39 is reset via NAND gate 52.

The rows are scanned sequentially, but decoders 43, 45 and 47 are only a part of the scanner 9 and do not go into the columns directly. Wherever there is a start, a count from zero to nine is obtained from decoder 43 and that count together with the output of decoder 45 or 47 provides a column output. Decoder 43, in conjunction with decoders 45 and 47, will scan through all the points in the matrix formed by the outputs of decoders 43, 45 and 47, decoder 43 continually going from zero to nine and, on the reset to zero, stepping the decimal counter 48 via lead 51, thereby scanning through all of the possible points in the matrix. The scanner matrix cross points each represent one column in the switch combinations composed of units 1, 3, 5 and 7.

The matrix provided has a NAND gate 54 for each set of cross points on the scanner matrix and this sequentially energizes information columns which are composed of the serial column positions of the units 1, 3, 5 and 7 of FIG. 1. In this way, the columns are scanned serially by means of the electronic scanner 9. Where a hole or appropriate indication is found on a particular column in a card or the like that is being scanned, an output is provided along one of the ten row lines 19 (Fig. 1) as previously described.

If the conditions are met in gate 25 (Fig. 1) then switch 131 is closed, turning off transistor 33 and satisfying one side of NAND gate 53. The other side of this gate is satisfied by a positive pulse from clock 35 so the clock 1 pulses go right through and clock counter 39. The first flip flop of counter 39 is used as a strobe pulse indicated by strobe 1 to tell the start-stop control 15 (FIG. 1) and its toggle control network 65 (FIG. 2) that the scanner is looking at a column and that now it can start serializing. The serializer clock 67 in turn comes on when lead 90 goes negative and starts clocking binary counter 77, through NAND gate 92 steering flip flop 94 and transistion detecting circuit 96. The binary output of counter 77 is applied to a data multiplexer which is essentially a serializer 49.

This serializer outputs the data present at inputs $E_0$ to $E_{15}$ at counts proceed 0 to 15 as represented by the binary input at pins 11, 13, 14 and 15 sequentially. At the count of 12, as set up by NAND gate 68, a pulse is generated through said NAND gate, telling the toggle control network 65 of the start stop control 15 that the serializing process has just ended for that particular column. The toggle control network 65 will now allow the column clock 35 or the adjustable delay network to emit a pulse on the clock 1 line back to counter 39. This sets up the next column. The scanner is now on column 2 and the cycle is repeated. At the end of the scanning cycle, which can be anywhere on any column, the output of NAND gate 69 will pull down the emitter of transistor 33, turning that transistor on which in turn will pull down the upper terminal on gate 53, inhibiting any more clock pulses from coming through on the clock 1 line. A full cycle has now been completed and scanning will proceed through the desired number of cycles. If it is desired to go through 109 the 10th position on decoder 45 and the 9 position in decoder 43 are wired by jumpers for a combination of 109.

Referring now to FIG. 3 there is shown a specific ASCII encoder 17 which takes inputs from the ten rows 19 of FIG. 1.

Though the invention has been described with respect to a specific preferred embodiment thereof, many variations and modifications thereof will immediately become apparent to those skilled in the art. It is therefore the intention that the appended claims be interpreted as broadly as possible in view of the prior art to include all such variations and modifications.

What is claimed is:

1. A data card terminal which comprises a scanner, said scanner including a pair of counting means, first clock means for stepping at least one of said counting means, bistable means responsive to a start signal for placing said bistable means into one of its stable states to activate said first clock means, means responsive to a predetermined count in one of said pair of counting means for controlling said bistable means, means responsive to said pair of counting means for scanning a predetermined column of information and providing a parallel output indication thereof, means for converting said parallel output to a serial output, and second clock means responsive to said bistable means being in the other of its stable states for activating said second clock means.

2. A data card terminal as set forth in claim 1 wherein said pair of counting means includes a first binary counter, a binary to decimal converter associated with said first counter, a second binary counter and a binary to decimal converter associated with said second counter.

3. A data card terminal as set forth in claim 2 wherein said first clock means step said first binary counter.

4. A data card terminal as set forth in claim 3 wherein said first binary counter steps said second binary counter.

5. A data card terminal as set forth in claim 1 further including means responsive to said means for converting and said second clock means for placing said bistable means in said one of its stable states.

6. A data card terminal as set forth in claim 2 further including means responsive to said means for converting and said second clock means for placing said bistable means in said one of its stable states.

7. A data card terminal as set forth in claim 3 further including means responsive to said means for converting and said second clock means for placing said bistable means in said one of its stable states.

8. A data card terminal as set forth in claim 4 further including means responsive to said means for converting and said second clock means for placing said bistable means in said one of its stable states.

* * * * *